United States Patent
Chen et al.

(10) Patent No.: US 9,790,374 B2
(45) Date of Patent: *Oct. 17, 2017

(54) AQUEOUS CROSS-LINKING COMPOSITIONS AND METHODS

(75) Inventors: Yue Chen, Edison, NJ (US); Yong Yang, Hillsborough, NJ (US); Robert J. Sheerin, North Caldwell, NJ (US); Jean Fredrick Mauck, Hackettstown, NJ (US); Navin Tilara, Roseland, NJ (US); Johanna Garcia de Visicaro, Lake Hopatcong, NJ (US)

(73) Assignee: Columbia Insurance Company, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/152,856

(22) Filed: Jun. 3, 2011

(65) Prior Publication Data

US 2012/0142847 A1    Jun. 7, 2012

Related U.S. Application Data

(60) Provisional application No. 61/351,657, filed on Jun. 4, 2010.

(51) Int. Cl.
| | |
|---|---|
| *C08K 5/24* | (2006.01) |
| *C08K 5/25* | (2006.01) |
| *C09D 133/08* | (2006.01) |
| *C09D 133/06* | (2006.01) |
| *C09D 133/26* | (2006.01) |
| *C09D 5/02* | (2006.01) |
| *C08G 59/40* | (2006.01) |
| *C09D 133/02* | (2006.01) |
| *C09D 163/00* | (2006.01) |

(52) U.S. Cl.
CPC ......... *C09D 5/024* (2013.01); *C08G 59/4014* (2013.01); *C09D 133/02* (2013.01); *C09D 133/068* (2013.01); *C09D 163/00* (2013.01); *C08L 2201/56* (2013.01)

(58) Field of Classification Search
CPC .......... C08K 5/24; C08K 5/25; C09D 133/08; C09D 133/26; C09D 133/068; C08L 2201/54
USPC .................................. 524/592, 593
See application file for complete search history.

(56) References Cited

U.S. PATENT DOCUMENTS

| | | | |
|---|---|---|---|
| 4,210,565 A * | 7/1980 | Emmons ........................ 524/560 |
| 4,246,148 A | 1/1981 | Hicks et al. | |
| 4,302,560 A | 11/1981 | Becher et al. | |
| 4,302,561 A | 11/1981 | Becher et al. | |
| 4,302,562 A | 11/1981 | Becher et al. | |
| 4,303,764 A | 12/1981 | Becher et al. | |
| 4,339,365 A | 7/1982 | Becher et al. | |
| 5,348,997 A | 9/1994 | Kato et al. | |
| 5,605,974 A | 2/1997 | Carpenter et al. | |
| 5,786,436 A | 7/1998 | Fischer et al. | |
| 5,877,253 A | 3/1999 | Matta et al. | |
| 5,905,109 A * | 5/1999 | Shimizu et al. .............. 524/506 |
| 6,465,556 B1 | 10/2002 | Pratt et al. | |
| 6,689,824 B2 | 2/2004 | Friel et al. | |
| 6,869,996 B1 | 3/2005 | Krajnik et al. | |
| 7,166,667 B2 | 1/2007 | Bakule | |
| 2002/0177655 A1 | 11/2002 | Pratt et al. | |
| 2006/0030662 A1 | 2/2006 | Yang et al. | |
| 2006/0231487 A1 | 10/2006 | Bartley | |
| 2007/0135567 A1 | 6/2007 | Ruhoff et al. | |
| 2007/0265391 A1 | 11/2007 | Yang et al. | |
| 2008/0139739 A1 | 6/2008 | Ma | |
| 2008/0307587 A1 | 12/2008 | Shah et al. | |
| 2009/0126826 A1 | 5/2009 | Smith | |

FOREIGN PATENT DOCUMENTS

| | | |
|---|---|---|
| EP | 0219047 A2 | 4/1987 |
| EP | 0945495 A1 | 9/1999 |
| JP | 10265729 A * | 10/1998 |
| JP | 2000001633 A | 1/2000 |
| WO | WO 0031197 A1 | 6/2000 |
| WO | WO 0075206 | 12/2000 |

OTHER PUBLICATIONS

Englich Translaiton of JP 10-265729; Hayashi et al; Oct. 1998.*
International Search Report dated Oct. 4, 2011, which issued in International Application No. PCT/US2011/039283.
Machine translation of JP 11-348417 (Dec. 21, 1999).

\* cited by examiner

*Primary Examiner* — Karuna P Reddy
(74) *Attorney, Agent, or Firm* — Ware, Fressola, Maguire & Barber LLP; George B. Snyder

(57) ABSTRACT

Water-borne cross-linking polymeric compositions and related embodiments, such as methods of making and using the compositions, as well as products formed with said compositions are described. For example, the water-borne composition may comprise polymers incorporating cross-linking functionality such as, but not limited to, carbonyl or epoxy functionality, and a blocked cross-linking agent, for example, a hydrazone. The cross-linking functionality does not react with the blocked cross-linking agent; however, the blocked cross-linking agent is capable of reacting with the alternative form cross-linking agent such as, but not limited to, a hydrazide, to yield a cross-linked polymer. The alternative form cross-linking agent may be formed in an equilibrium reaction including the blocked cross-linking agent.

43 Claims, No Drawings

AQUEOUS CROSS-LINKING COMPOSITIONS AND METHODS

CROSS-REFERENCE TO RELATED APPLICATION

This application claims the benefit of U.S. Provisional Patent Application Ser. No. 61/351,657, filed 4 Jun. 2010, which is incorporated herein by reference in its entirety as if fully set forth below

FIELD OF THE INVENTION

The invention concerns water-borne cross-linking polymeric compositions and related embodiments, such as methods of making and using the compositions, as well as products formed with said compositions.

BACKGROUND

Water-borne paints, primers, coatings, inks, adhesives, and other water-borne film-forming compositions ("water-borne compositions") may comprise solvents, binder, pigments and other additional components that favorably affect various properties of the compositions, such as polymeric surfactants and dispersants. The binder and the pigment, if present, are the primary solid components of the water-borne composition and remain on surfaces to which they have been applied forming a solid layer as solvent evaporates. In water-borne compositions, the primary solvent is water. Typical water-borne compositions include latex paints.

Polymer latexes or dispersions are widely used in water-based coatings. The polymer latex or dispersion is dried to form a film via coalescence to obtain desired mechanical and physical properties. Coalescence is a process whereby polymer particles in aqueous dispersion come into contact with one another during drying, and polymer chains form (i.e., diffuse) across boundaries of latex/dispersion particles to yield continuous films with good bonding of the particles.

A method of improving the properties of films formed by water-borne compositions is to include polymers that are capable of cross-linking. The polymers may be self cross-linking or require a cross-linking agent to react with the polymers. The cross-linking agents can be used to cross-link the binders and/or other polymeric additives such as polymeric surfactants and dispersants (U.S. Pat. No. 5,348,997) or rheology modifiers (U.S. Published Patent Application No. 2009/0162669). Cross-linking of polymers in coatings, inks, and other water-borne film-forming compositions can improve physical and mechanical strength, adhesion, and durability. In coating applications, cross-linking may also improve scrubability, blocking resistance, chemical resistance, and weatherability (See U.S. Pat. No. 7,547,740 and U.S. Patent Application Publication No. 2007/0265391). Cross-linking of polymer constituents may also enhance adhesion and bonding strength for adhesives. Additionally, cross-linking is widely utilized in the formulation of printing inks, in order to improve the mechanical and chemical resistance of prints.

Cross-linking during and after coalescence will further enhance the physical and mechanical properties of the films. However, if the cross-linking reaction between the polymers begins before the water-borne composition is applied to a surface, the resultant film may have poor physical and mechanical properties. Premature cross-linking is that which occurs within the polymer latex or dispersion before it is applied and may prevent coatings from forming coalesced films.

Premature cross-linking in compositions used for paints, inks, adhesives, dispersants, polymeric surfactants or rheology modifiers can also be disadvantageous in causing viscosity instability, thus reducing shelf-life. For example, typical latex base paints are manufactured in bulk and then dispensed into retail containers for shipping and storage. The retail container and its contents may be kept in a warehouse or a retail store prior to sale and ultimate use. During this storage period, cross-linking of the polymers may occur, thereby reducing the quality of the latex paint. The cross-linked polymers may gel and/or build up viscosity in the can and a paint film formed therefrom can have reduced physical and mechanical properties such as reduced scrubability.

Thus, in an effort to improve properties, water-borne compositions have been produced with polymers comprising a monomer such as diacetone acrylamide ("DAAM") and the cross-linking agent adipic acid dihydrazide ("ADH"). Without significant pre-application cross-linking, such water-borne compositions give improved properties over paint comprising non-cross-linkable polymer, but the improvement is not realized if there is any substantial pre-application cross-linking. Studies have shown that the cross-linking of polymers comprising DAAM with ADH cross-linking agent through a keto-hydrazide reaction has a substantial reaction rate in an aqueous solution. ("The diacetone acrylamide cross-linking reaction and its influence on the film formation of an acrylic latex", Journal of Coatings Technology and Research, 5(3), 285-297, 2008.) Consequently, premature cross-linking impedes the attainment of desired properties.

Other polymers are self-cross-linking. Self-cross-linking polymers such as polymers containing acetoacetoxyethylmethacrylate ("AAEM"), glycidal methacrylate, and oxidative or UV curable functional groups are also used in water-borne coatings, inks, and adhesives. Unfortunately, self-cross-linked polymers yield only minimally improved mechanical properties of the resultant films, particularly for scrubability of water-borne paints.

An attempt to address the problem of cross-linking prior to application of a polymeric composition containing a polyhydrazide or the like, appears in U.S. Pat. No. 4,786,676. There it is taught that polymeric compositions which have a long shelf life in aqueous solutions or dispersions and which undergo cross-linking after drying at room temperature or elevated temperatures are obtainable by reacting polymeric organic compounds possessing carbonyl and carboxyl groups with polyhydrazides in the presence of monoketones and/or monoaldehydes. However, the development discussed in the patent is not adequate for reliably suppressing premature cross-linking because there are side reactions which introduce impurities that degrade the desired stoichiometry, because any chemical species that might prevent premature cross-linking would not be produced in sufficient quantity within a time frame that the undesired reaction could be precluded, and because the use of (at least) ketones can present a safety hazard. Therefore, the patent's teaching does not afford a practical solution.

There exists a need for a water-borne composition with improved physical, chemical and mechanical properties, such as, scrubability. Further, there is a need for a water-borne composition wherein a component cross-linkable polymer does not undergo significant cross-linking prior to application of the composition, especially for water-borne paints.

SUMMARY OF THE INVENTION

It is an object of the invention to provide a water-borne composition containing a cross-linkable polymer in which premature cross-linking is mitigated.

It is another object of the invention to provide a water-borne composition comprising a cross-linkable polymer which, when applied to a surface, forms a film with good mechanical and physical properties.

It is still another object of the invention to provide a cross-linked polymeric material which, as a component of a film formed, results in the exhibition of good mechanical and physical properties by the film.

It is yet another object of the invention to provide methods of making and using the water-borne composition as aforesaid, and a coating or the like made therefrom and exhibiting one or more favorable mechanical or physical properties.

Accordingly, in one aspect the invention is directed to a water-borne polymeric composition, which comprises: water; a polymer comprising one or more carbonyl groups, one or more epoxy groups, or both one or more carbonyl groups and one or more epoxy groups; and a blocked cross-linking agent having at least one hydrazone group incorporated therein.

In another aspect the invention is directed to a cross-linked polymeric material, which comprises: a first polymer moiety and a second polymer moiety; and cross-linkage formed by reaction of a cross-linking agent with each of the first and second polymer moieties, which agent is derived from a blocked cross-linking agent having at least one hydrazone group incorporated therein, said cross-linkage being between a plurality of sites on the first polymer moiety and their respective corresponding sites on the second polymer moiety via a cross-linking moiety attached at one of said sites on the first polymer moiety and also at the corresponding site on the second polymer moiety; each of the sites on the first and second moieties being one at which there was a carbonyl group or epoxy group prior to cross-linking.

In yet another aspect the invention is directed to a method of preparing a water-borne composition, comprising: combining a blocked cross-linking agent comprising at least one hydrazone group and an aqueous dispersion of one or more cross-linkable polymers, wherein at least one polymer in the dispersion comprises one or more carbonyl groups, one or more epoxy groups, or both one or more carbonyl groups and one or more epoxy groups.

In a further aspect the invention is directed to a method of making a cross-linked polymeric material, which comprises combining an aqueous dispersion of a first polymer moiety having incorporated therein one or more carbonyl groups, one or more epoxy groups, or both one or more carbonyl groups and one or more epoxy groups and a second polymer chain having incorporated therein one or more carbonyl groups and one or more epoxy groups, or both one or more carbonyl groups and one or more epoxy groups; and a blocked cross-linking agent having at least one hydrazone group incorporated therein.

And, in still another aspect the invention is directed to a method of coating a surface, comprising: applying an aqueous polymeric dispersion on a surface, wherein the aqueous polymeric dispersion comprises water, one or more polymers, and a blocked cross-linking agent comprising at least one hydrazone group, wherein at least one of the polymers comprises one or more carbonyl groups, one or more epoxy groups, or both one or more carbonyl groups and one or more epoxy groups, and correspondingly directed to a coating formed by such method.

In even broader aspects the invention is directed to (i) a water-borne composition as aforesaid, except that the polymer is one having functionality capable of interacting with a cross-linking agent, which functionality can be (without limitation) carbonyl, epoxy or both, and said blocked cross-linking agent along with said cross-linking agent are such that the blocked cross-linking agent has at least one functional group that is not capable of reacting with said functionality of the polymer but is convertible via an equilibrium reaction to an alternative functional group, thereby to provide the cross-linking agent which is capable of reacting with said functionality;

(ii) a cross-linked polymeric material as aforesaid, except that the first and second polymer moieties have the functionality, and said blocked cross-linking agent as well as said cross-linking agent are, as described in subpart (i) preceding;

(iii) a method of preparing a water-borne composition as aforesaid, except that said at least one polymer has the functionality, and the blocked cross-linking agent as well as the cross-linking agent are, as described in subpart (i) preceding; and (iv) a method of coating a surface, and a coating formed by such method, as aforesaid, except that said at least one of the polymers has the functionality, and the blocked cross-linking agent as well as the cross-linking agent are, as described in subpart (i) preceding.

As used herein, "polymer" refers to a macromolecule formed by the chemical union of monomers, typically five or more monomers. The term polymer includes homopolymers and copolymers including random copolymers, statistical copolymers, alternating copolymers, gradient copolymers, periodic copolymers, telechelic polymers and polymers of any topology including block copolymers, graft polymers, star polymers, bottle-brush copolymers, comb polymers, branched or hyperbranched polymers, cross-linked polymers and such polymers tethered to particle surfaces or flat surfaces as well as other polymer structures.

The invention confers substantial benefit on its practitioner. Utilization of a blocked cross-linking agent mitigates an occurrence of premature cross-linking in the innovative water-borne composition. Therefore, coalescence of polymer solids in a deposit of the composition on a surface is less inhibited by premature cross-linking, and advantageous mechanical or physical properties including adhesion, toughness, water-resistance and scrubability can be attained. Moreover, the presence of substances such as acetone can be eliminated from production operations, thus omitting a source of side reactions and substances which are flammable or volatile. This provides an enhanced level of stoichiometric control and operational safety.

Other aspects and features of embodiments of the present invention will become apparent to those of ordinary skill in the art, upon reviewing the following description of specific, exemplary embodiments of the present invention in concert with the figures. While features of the present invention may be discussed relative to certain embodiments and figures, all embodiments of the present invention can include one or more of the features discussed herein. While one or more embodiments may be discussed as having certain advantageous features, one or more of such features may also be used with the various embodiments of the invention discussed herein. In similar fashion, while exemplary embodiments may be discussed below as system or method embodiments it is to be understood that such exemplary embodiments can be implemented in various systems and methods.

DETAILED DESCRIPTION OF CERTAIN PREFERRED EMBODIMENTS

A central feature of the invention is the regulation of cross-linking in film-forming as well as other polymers which have cross-linkable functionality. This is achieved through utilization of an inhibited cross-linking agent that is subject to an equilibrium reaction between one chemical form that is not capable of reacting with the cross-linkable functionality to cross-link the polymers ("blocked cross-linking agent") and an alternative form that is capable of entering into a cross-linking reaction with such functionality ("cross-linking agent"). The cross-linking functionality may be pendant cross-linking functionality. In advantageous embodiments, the equilibrium of the reaction is shifted toward the blocked cross-linking agent prior to application of compositions containing the above mentioned polymer to a surface and the equilibrium is shifted toward formation of the cross-linking agent after such compositions are applied to a surface.

Though not wishing to be bound or limited by any mechanism or theory, we conclude that the cross-linking of the polymeric constituents may be inhibited because the hydrazone does not react directly with the carbonyl or epoxy groups on the polymer, with the consequence that cross-linking does not occur to a significant extent, especially within any relevant time-frame. By way of illustration, in a preferred embodiment, the blocked cross-linking agent comprises a hydrazone group and the polymers comprise one or more carbonyl and/or epoxy groups.

Thus, a water-borne composition comprises polymers incorporating cross-linking functionality, $P_1$-$R_{CL}$ and $P_2$-$R_{CL}$, and a blocked cross-linking agent, NCLA. The cross-linking functionality, $R_{CL}$, does not react with the blocked cross-linking agent, NCLA, but is capable of reacting with the alternative form cross-linking agent, CLA, to yield the cross-linked polymer P-CL-P, wherein CL is the cross-link between the two polymer chains, P, as follows:

$$P_1\text{-}R_{CL} + P_2\text{-}R_{CL} + CLA \rightarrow P_1\text{-}CL\text{-}P_2 + A \quad (I)$$

The cross-linking agent needed for the reaction to proceed is preferably not included, or otherwise present, to any material extent (i.e., to an extent that any substantial premature cross-linking would occur) in a water-borne composition according to our invention before its application to a surface, but is formed at the desired time under conditions according to the equilibrium reaction between the blocked cross-linking agent and the cross-linking agent:

$$NCLA \rightleftharpoons CLA + N \quad (II)$$

The equilibrium of the chemical reaction II may be shifted by any change in the prevailing conditions, such as, but not limited to, water concentration, reduction of compound N, reaction of compound CLA, or exposure to visible or ultraviolet light.

It follows that a blocked cross-linking agent is any compound that when present in an aqueous composition comprising a cross-linkable polymer is in a nonreactive (i.e., blocked) state vis-à-vis the polymer but through an equilibrium reaction can be converted to a cross-linking agent in the nature of a chemical compound that is capable of reacting with functionality on two or more polymers to link the polymers together.

Cross-linking and Blocked Cross-linking Agents

The blocked cross-linking agent can comprise as few as one hydrazone group, though there can be at least one other moiety capable of reacting with the cross-linking functionality of cross-linkable polymer, for instance, a hydrazine moiety. However, in preferred embodiments, the blocked cross-linking agent comprises at least two hydrazone groups. For example, the blocked cross-linking agent may be adipic acid di(propylidene hydrazide). In an aqueous phase or merely with moisture present, adipic acid di(propylidene hydrazide) has the following equilibrium with acetone and adipic acid dihydrazide:

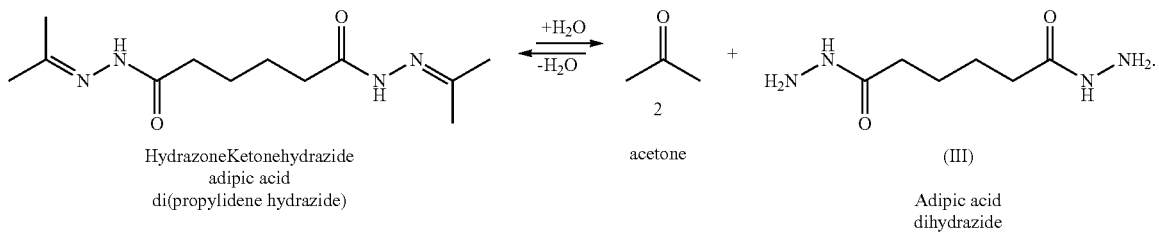

HydrazoneKetonehydrazide
adipic acid
di(propylidene hydrazide)

acetone (III)

Adipic acid
dihydrazide

The hydrazone is a blocked cross-linking agent that will not significantly react with a polymer comprising functionality such as a carbonyl group or an epoxy group. However, adipic acid di(propylidiene hydrazide), a hydrazone, reacts with the water to form acetone, a ketone, and adipic acid dihydrazide, a hydrazide. The hydrazide, however, is a cross-linking agent that is capable of reacting with the carbonyl group or epoxy group of the polymer. The reaction is reversible and the water may be expelled with the hydrazone being reformed. Eventually, the reversible reaction reaches equilibrium between the hydrazone and the hydrazide as shown in Equation III.

Under certain conditions, this reversible reaction has an equilibrium that is strongly shifted leftward or toward the production of the hydrazone and only a small amount (no more than a few, e.g., 5 and preferably 3, percent) hydrazide is present in the water-borne composition. The hydrazones will not react with the carbonyl or epoxy groups of the polymers directly, thus mitigating premature cross-linking of the polymers. In such an embodiment, cross-linking of the polymers is inhibited in the presence of water or moisture. However, during the drying process after application of the composition to a surface, the equilibrium will shift toward the formation of hydrazide groups (NH2NH—) which are capable of reacting with the carbonyl and epoxy groups. This is because during drying, ketone or aldehyde constituents are evaporating and the hydrazide groups are reacting to cross-link the polymers, thus shifting the equilibrium to the formation of additional hydrazide. More hydrazone, and eventually nearly all of the hydrazone, will be converted to hydrazides which react to cross-link the polymers as the film dries and cures.

More specifically, the ketone or aldehyde formed in conversion of the hydrazone to the hydrazide has a low boiling point. With a low boiling point, the ketone or aldehyde evaporates and even though water is also evaporating as the coating dries, reformation of the hydrazone is prevented by depletion of the ketone or aldehyde.

Since depletion of the ketone or aldehyde drives production of the hydrazides it causes completion of the cross-linking reaction. Therefore, the volatility of the ketone or aldehyde will determine the rate and extent of cross-linking. Higher volatility, lower boiling point ketones or aldehydes will result in a high rate of hydrazide formation and an early physical and mechanical property development in the dried products. In certain embodiments, the ketones and aldehydes will have boiling point below 200° C., a vapor pressure at 25° C. above 1.7 mm Hg, and an evaporation rate (vs. butyl acetate) above 0.1; in further embodiments, the ketones and aldehydes will have boiling point below 150° C., a vapor pressure at 25° C. above 15 mm Hg, and an evaporation rate (vs. butyl acetate) above 0.2; and in even further embodiments, the ketones and aldehydes will have boiling point below 100° C., a vapor pressure at 25° C. above 23 mm Hg, and an evaporation rate (vs. butyl acetate) above 0.3.

A suitable blocked cross-linking agent comprising two hydrazone groups has the formula:

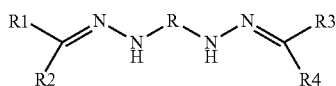
(IV)

or the formula:

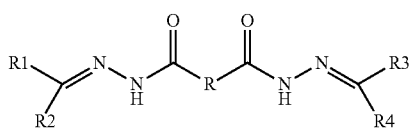
(V)

and a suitable blocked cross-linking agent comprising one hydrazone group and a hydrazine group has the formula:

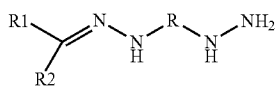
(VI)

or the formula:

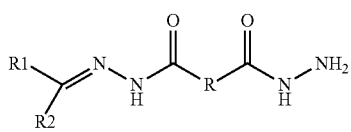
(VII)

wherein, in any of the embodiments of the cross-linking agents of formulae (IV) to (VII), R is a divalent organic group or a covalent bond and R1, R2, R3, and R4 are independently selected from hydrogen and an organic group. More specifically, R1, R2, R3, and R4 are independently selected from: C1 to C12 linear alkyl, alkenyl, or alkynyl; branched alkyl, alkenyl, or alkynyl having a C1 to C12 primary chain. Alternatively, R1 and R2 or R3 and R4 joined together to form a cyclic organic group. The foregoing species can be unsubstituted, or any hydrogen on the straight or branched alkyl, alkenyl, or alkynyl (including when two are joined together) can be substituted with hydroxyl, amino, phenyl, benzyl, or halogen. For example, R1, R2, R3, and R4 can be independently selected from methyl, ethyl, n-propyl, n-butyl, iso-butyl, tert-butyl, n-amyl, iso-amyl, n-hexyl, n-heptyl, n-octyl, iso-octyl, n-nonyl, n-decyl, n-undecyl or n-dodecyl group and if R1 and R2 or R3 and R4 are a cyclic group, the cyclic group can be cyclopentyl or cyclohexyl. Of course, more than one blocked cross-linking agent can be utilized, and it will be appreciated that at least one agent of one, the other or both of formulae (IV)-(V), or formulae (VI)-(VII), can be present. Examples of hydrazones include, but are not limited to, succinic acid di(propylidene hydrazide), oxalic acid di(2-propylidene hydrazide), adipic acid di(2-propylidene hydrazide), adipic acid di(2-butylidene hydrazide), and adipic acid di(4-hydroxy-4-methyl-2 pentylidene hydrazide).

As indicated, a blocked cross-linking agent can comprise one hydrazide group and one hydrazone group. While the hydrazide group may react with one carbonyl group on the polymer chain, cross-linking does not occur without the further reaction of the hydrazone group. More specifically, cross-linking does not occur until the hydrazone is converted to a second hydrazide group.

The blocked cross-linking agent may be added to the water-borne composition as a liquid, in solid form, or as a slurry such as the blocked cross-linking agent in water.

Hydrazones can be prepared by reacting aldehyde or ketones with di or multi-hydrazides, such as carboxylic acid di or multifunctional hydrazides, for instance:

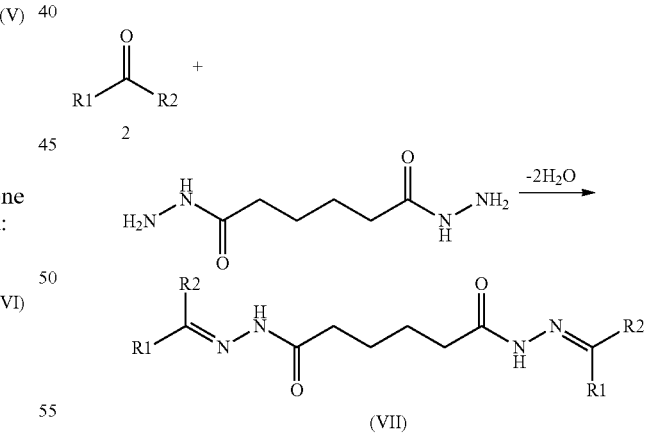

Examples of multifunctional hydrazides include, but are not limited to: $C_2$-$C_{18}$ saturated dicarboxylic acid dihydrazides such as oxalic acid dihydrazide, malonic acid dihydrazide, glutaric acid dihydrazide, succinic acid dihyrazide, adipic acid dihydrazide, sebacic acid dihydrazide and the like; monoolefinic unsaturated dicarboxylic acid dihydrazides such as maleic acid dihydrazide, fumaric acid dihydrazide, itaconic acid dihydrazide and the like; terephtalic acid dihydrazide or isophthalic acid dihydrazide; pyromellitic acid dihydrazide, multifunctional hydrazide containing three or more hydrazide groups, trihydrazide or tetrahydrazide, such as citric trihydrazide, nitrilo-acetic trihydrazide, cyclohexanoic tricarboxylic trihydrazide, ethylene diamine tetraacetic tetrahydrazide and the like; nitrilotrihydrazide, citric acid trihydrazide, 1,2,4-benzene trihydrazide, ethylenediaminetetraacetic acid tetrahydrazide, 1,4,5,8-naphthoic acid tetrahydrazide; polyhydrazides such as those obtained through reaction of low molecular weight polymers having carboxylic acid lower alkyl ester groups with hydrazine or hydrazine hydrate; and polyfunctional semicarbazides.

The hydrazide or dihydrazide can be reacted with a compound of the formula:

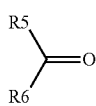

(VIII)

wherein R5 and R6 are independently selected to be hydrogen or an organic group, with at least one being an organic group.

Examples of such, organic groups are alkyl groups, preferably of from 1 to 12 carbon atoms, linear or branched, for instance, a methyl, ethyl, n-propyl, n-butyl, iso-butyl, tert-butyl, n-amyl, iso-amyl, n-hexyl, n-heptyl, n-octyl, iso-octyl, n-nonyl, n -decyl, n-undecyl or n-dodecyl group. The alkyl group is more preferably of from 1 to 3 carbon atoms, and most preferably, 1 carbon atom. $R^5$ or $R^6$ can be substituted for instance, by a hydroxyl, amino, amine or other functional group. Further, $R^5$ and $R^6$ can be joined together to form a cyclic group such as, but not limited to, cyclopentyl or cyclohexy; in certain embodiments where $R^5$ and $R^6$ are joined together as aforesaid, the blocked cross-linking agent has the formula

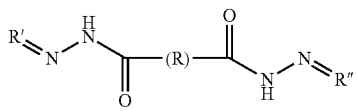

with each of R' and R" being selected to be independently of the other an aforementioned cyclic organic group, and R being a divalent organic group or a covalent bond.

If either of R5 and R6 is hydrogen, the compound of formula VIII is an aldehyde (an aldehyde is an organic group containing a formyl group, —HCO). Examples of aldehydes include, but are not limited to, formaldehyde, acetaldehyde, butyraldehyde, benzaldehyde, cinnamaldehyde, and toluyldehyde. If both of R5 and R6 are organic, the compound of formula VIII is a ketone. Examples of ketones are acetone, methyl ethyl ketone, diethyl ketone, isopropyl methyl ketone, n-propyl methyl ketone, di-isopropyl and di-n-propyl ketone, tert-butyl methyl ketone, isobutyl methyl ketone, sec-butyl methyl ketone and diisobutyl ketone, diacetone alcohol, cyclohexanone, 1-propanone, 2-propanone and acetophenone.

In embodiments of a method of forming a water-borne composition comprises adding a hydrazone to the composition. The hydrazone may be added in any form, however, there may be advantages to adding the hydazone in a solid form. The hydrazone may be added as a solid such as in a powder form or as a slurry such as an aqueous slurry or dispersion of hydrazone. The hydrazone may also be formed in situ in the water-borne composition. However, adding the hydrazone in solid form has several advantage over forming the hydrazone in the water-borne composition, for example, adding the hydrazone in solid form avoids the use a flammable materials, such as acetone, at the point of formulation of the water-borne composition, allows more precise control of the hydrazone formation and control over stoichmetric conversion of the hydrazide to hydrazone, better control over side reactions and byproduct formation, and a reduction in premature cross-linking in the water-borne composition.

Cross-linkable Polymers

Embodiments of the cross-linkable polymers can be any polymer comprising functionality that is capable of reacting with the reactive cross-linking agent and does not significantly react with the blocked cross-linking agent. Suitable polymers that will react with the hydrazide cross-linking agent include polymers that contain carbonyl groups such as ketone or aldehyde groups and/or epoxy groups. The cross-linking interaction can be between polymer moieties (e.g., portions or segments) of a single polymer unit (for instance, a chain), or moieties of or constituting different polymer units, such as a first polymer chain and a second polymer chain.

Examples of polymer comprising at least one carbonyl and/or epoxy group are vinyl, acrylic, and/or styrenenated copolymers containing monomer units of a vinyl alkyl ketone, including, but not limited to, vinyl methyl ketone, vinyl ethyl ketone and/or vinyl butyl ketone; vinylaceto acetate, acetoacetoxyethyl acrylate, acetoacetoxyethyl methacrylate, and mixed esters of aliphatic diols with (meth)acrylic acid and acetoacetic acid; (meth)acrolein, crotonaldehyde, diacetone acrylamide, diacetone(meth)acrylamide, diacetone (meth)acrylate, anhydride monomers such as maleic or halomaleic anhydride monomers, or any other vinyl or acrylic monomer unit containing at least one carbonyl.

Polymers having epoxy groups can be made from epoxy-containing polymerizable unsaturated monomers, which include, but are not limited to, compounds having one epoxy group and one polymerizable unsaturated group per molecule. For example, glycidyl meth(acrylate), β.-methylglycidyl meth(acrylate), 3,4-epoxycyclohexylmethyl meth (acrylate), 3,4-epoxycyclohexylethyl meth(acrylate), 3,4-epoxycyclohexylpropyl meth(acrylate), allylglycidyl ether, and the like, can be used either singly or in combination of two or more.

Also suitable are ethylenically unsaturated monomers such as (meth)acrylates, styrenenated monomers, and vinyl esters, which can be used as co-monomers. Examples of (meth)acrylates include various ($C_1$-$C_{20}$) alkyl or ($C_3$-$C_{20}$) alkenyl esters of (meth)acrylic acid; for example, methyl (meth)acrylate, ethyl (meth)acrylate, n-propyl (meth)acrylate, isopropyl (meth)acrylate, n-butyl (meth)acrylate, isobutyl (meth)acrylate, pentyl (meth)acrylate, 2-ethylhexyl (meth)acrylate, decyl (meth)acrylate, dodecyl (meth)acrylate, stearyl (meth)acrylate, α-chloroethyl (meth)acrylate, cyclohexyl (meth)acrylate, phenyl (meth)acrylate, methoxyethyl (meth)acrylate, ethoxyethyl (meth)acrylate, methoxypropyl (meth)acrylate, ethoxypropyl (meth)acrylate lauryl acrylate, methyl methacrylate, butyl methacrylate, ethyl methacrylate, isodecyl methacrylate, and lauryl methacrylate. The expression (meth)acrylic acid is intended to serve as a generic expression embracing both acrylic and methacrylic acid. Similarly, the expression (meth)acrylate is intended as a generic expression embracing both acrylic acid and methacrylic acid esters. Examples of styrenated monomers include styrene, alkylstyrenes (e.g., α-ethylstyrene, a-methylstyrene, vinyl toluene, 2,4-dimethylstyrene, 4-t-butylstyrene, and the like), and halostyrenes (e.g., α-bromostyrene, 2,6-dichlorostyrene, and the like). Examples of vinyl esters include vinyl carboxylate alkyl ethers (e.g., vinyl acetate, vinyl propionate, vinyl butyrates, vinyl benzoates, halo-substituted versions thereof such as vinyl chloroacetate, and the like), and Veova monomers. Other ethylenically unsaturated monomers that can be used as co-monomers include carboxylic group-containing monomers, hydroxyl group-containing monomers, amide group-containing monomers, and amino group-containing monomers.

Other polymers comprising carbonyl and/or epoxy groups can also be used for this invention. Examples are polyurethane or polyurethane dispersions, acrylic/urethane hybrids, alkyd/urethane hybrids, alkyds, polyesters, and water dispersible epoxy.

Primer latexes are water-borne compositions used for coating surfaces. Primer latexes typically comprise lower molecular weight, soft polymers. The lower molecular weight polymers are more readily absorbed into a substrate, thereby providing strong adhesive and chalk binding properties. Therefore, embodiments of the primer latexes comprise water, low molecular weight polymer comprising cross-linking functionality, and a blocked cross-linking agent comprising at least one first functional group that is not capable of reacting with the reactive functional group on the polymer and is capable of converting to a second functional group, wherein the second functional group is capable of reacting with the reactive functional group.

The molecular weight of the polymers in the primer latex should be low enough to allow at least partial absorption of the polymers into the substrate yet still high enough to provide a coherent coating. In certain embodiments, the low molecular weight polymer has a number average molecular weight of less than 100,000 Daltons. In further embodiments, the low molecular weight polymer has a number average molecular weight of less than 50,000 Daltons. In still further embodiments, the low molecular weight polymer has a number average molecular weight of less than 25,000 Daltons.

The low molecular weight polymers in the primer latex may further exhibit a low glass transition temperature, Tg. The glass transition temperature is the temperature at which the amorphous domains of the polymer take on the characteristic properties of the glassy state—brittleness, stiffness, and rigidity. Low molecular weight polymers with a low glass transition temperature provide the primer latex with strong adhesion, chalk binding, flexibility and toughness. In certain embodiments, the latex primer comprises polymers with a glass transition temperature less than 10° C. In further embodiments, the latex primer comprises polymers with a glass transition temperature less than 6° C. In still further embodiments, the latex primer comprises polymers with a glass transition temperature less than 4° C. The glass transition temperature is determined on a Differential Scanning Calorimeter. An example of a latex primer was produced as described in Example 14, wherein the primer latex comprises a polymer having a number average molecular weight 24,700 g/mol, a weight average molecular weight 60,400 g/mole, and a Tg of 1.7° C.

The primer latex may comprise a hydrazone cross-linking agent as described above and polymers that will react with the hydrazide cross-linking agent, which include polymers that contain carbonyl groups such as ketone or aldehyde groups and/or epoxy groups.

EXAMPLES

Example 1

Preparation of dihydrazone, succinic acid di(2-propylidene hydrazide)

The succinic acid di(2-propylidene hydrazide) was prepared by the reaction of 2-propanone with succinic acid dihydrazide. The general process for production of the dihydrazone in these examples is to mix a dihydrazide with water and subsequently add the ketone or aldehyde. 60 grams of water and 40 grams of succinic acid dihydrazide were added to a stainless steel flask. An agitator in the stainless steel flask mixed the ingredients for 10 minutes. Under continued mixing, 16 grams of 1-propanone was added to the flask. A white dispersion was formed. The dispersion was filtered to collect a white powder. The powder was then dried at 40° C. under vacuum for 24 hours. The final product was a white powder of succinic acid di(2-propylidene hydrazide) which has the chemical structure:

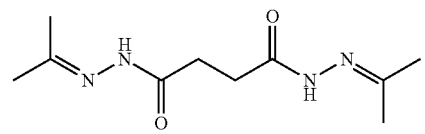 [SMILES: CC(C)=NNC(=O)CCC(=O)NN=C(C)C]

Example 2

Preparation of dihydrazone, oxalic acid di(2-propylidene hydrazide)

The process was the same as in Example 1, except 40 grams of water, 20 grams of oxalyl dihydrazide, and 10 grams of 2-propanone were used. The final product was a white powder of oxalic acid di(2-propylidene hydrazide) with the chemical structure:

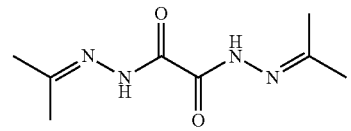

Example 3

Preparation of dihydrazone, adipic acid di(2-propylidene hydrazide)

The process was the same as in Example 1, except 100 grams of water, 40 grams of adipic acid dihydrazide, and 36 grams of 2-propanone were used. The final product was a white powder of adipic acid di(2-propylidene hydrazide).

Example 4

Preparation of Cross-linking Agent Comprising One hydrazone and One hydrazine Group The process was the same as in Example 1, except 100 grams of water, 40 grams of adipic acid dihydrazide, and 13.5 grams of 2-propanone were used. The mole ratio of adipic acid dihydrazide to 2-propanone was 2 to 1. The primary product has a chemical structure:

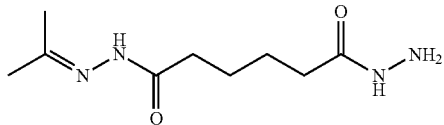

Example 5

Preparation of a Mixture of a Cross-linking Agent Comprising a dihydrazone and a Cross-linking Agent Comprising One hydrazone and One hydrazine Group The process is the same as in Example 1, except 62.7 grams of water, 25 grams of adipic acid dihydrazide, and 12.3 grams of 2-propanone were used. The mole ratio of adipic acid dihydrazide to 2-propanone was 1.5 to 1. The final product was a mixture of the products in Example 3 and Example 4.

Example 6

Preparation of adipic acid di(2-propylidene hydrazide) Dispersion

In a stainless steel flask equipped with an agitator, 58.6 grams of water were added, the agitator was turned on, then 25 grams of adipic acid dihydrazide were added. The mixture was agitated for at least 10 minutes until a stable dispersion was formed. 16.4 grams of 2-propanone were then added under mixing. A clear solution formed after a few minutes. Mixing was continued for at least another hour until reaction product precipitated and formed a stable dispersion.

Example 7

Preparation of adipic acid di(2-butylidene hydrazide) Dispersion

The procedure is the same as in Example 6, except 28 grams of water, 3 grams of methyl ethyl ketone, and 1.5 grams of adipic acid dihydrazide were used. The final reaction product was an aqueous dispersion of adipic acid di(2-butylidene hydrazide) having the following chemical structure:

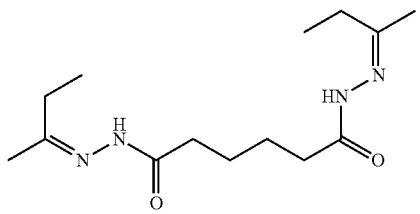 [SMILES: CC/C(C)=N\NC(=O)CCCCC(=O)N/N=C(/C)CC]

Example 8

Preparation of adipic acid di(4-Hydroxy-4-methyl-2-pentylidene hydrazide) Dispersion The procedure was the same as in Example 6, except 28 grams of water, 2.4 grams of 4-Hydroxy-4-methyl-2-pentane (diacetone alcohol), and 1.5 grams of adipic acid dihydrazide were used. The final reaction product was an aqueous dispersion of adipic acid di(4-Hydroxy-4-methyl-2-pentylidene hydrazide) with the chemical structure:

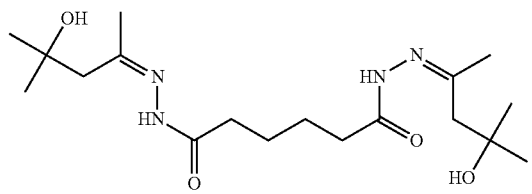 [SMILES: C/C(CC(C)(C)O)=N/NC(=O)CCCCC(=O)N/N=C(/C)CC(C)(C)O]

Example 9

Preparation of Paints with polymer Comprising a ketone Group and with a Conventional Cross-linking Agent adipic acid dihydrazide (Comparative Example)

A water-borne paint comprising an acrylic copolymer (49% solids by weight) latex made from 49% methacrylate (MMA), 48% 2-ethyl hexylacrylate (2EHA) and 3% diacetone acrylamide (DAAM) was prepared. A conventional cross-linking agent, adipic acid dihydrazide, was used in the paint. The batch size is 100 gallons.

TABLE 1

| Paint formula for Example 9 | |
|---|---|
| Ingredient | lbs |
| WATER | 70 |
| KATHON LX 1.5% (biocide) | 1 |
| Potassium Triphosphate | 1 |
| TAMOL 1124 (dispersant) | 12 |
| IGEPAL CO-630 (surfactant) | 3.5 |
| TI-PURE R-706 (Titanium dioxide) | 285 |
| ATTAGEL 50 (extender pigment) | 5 |
| FOAMSTAR A-45 (defoamer) | 1.5 |
| BYK-420 (rheology additive) | 2.6 |
| Grind for 15 minutes, then add following ingredients in a thin-down container | |
| PROPYLENE GLYCOL | 2.5 |
| WATER | 55 |
| EASTMAN EEH SOLVENT (coalescence) | 6 |
| Acrylic latex (49% solids) | 440 |
| EASTMAN OPTIFILM 400 (Plasticizer) | 8 |
| AMMONIA HYDROXIDE (29%) | 1 |
| ADIPIC ACID DIHYDRAZIDE | 6 |
| ACRYSOL RM-5000 (rheology additive) | 19 |
| ACRYSOL RM-825 (rheology additive) | 3 |
| FOAMSTAR A-45 | 2 |
| BYK-022 (defoamer) | 6 |
| WATER | 180 |
| POLYPHASE 663 (midewcide) | 4.75 |

Example 10

Preparation of Paints with polymer Comprising a ketone Group and with a dihydrazone Blocked Cross-linking Agent A water-borne paint was made, comprising the same acrylic copolymer and paint formula as in Example 9 except that adipic acid dihydrazide was-Replaced by 24 lbs of adipic acid di(2-propylidene hydrazide) dispersion from Example 6, and the amount of water in the thin-down was reduced by 18 lbs to adjust the volume of paint to 100 gallons.

Example 11

Scrubability of Paints of Example 9 and Example 10

The scrub tests were performed for the paints of Example 9, prior art paint comprising a dihydrazide cross-linking agent, and Example 10, water-borne paint comprising a dihydrazone blocked cross-linking agent. The tests were done on fresh prepared paints, and paint aged for six months. The scrub test was performed using ASTM D2486 Method B on 7-mil paint draw downs dried for 7 days. A BYK-Gardner Abrasion Tester with a boat weighing 1000 grams was used for the test. The scrub cycle number at failure was recorded (where the paint film was removed and the surface of the underlying substrate shows through). A higher cycle number indicates a better scrub resistance for the paint.

TABLE 2

Scrub Cycles of Paints

| Time paint aged | Example 10 | Example 9 (comparative example) |
|---|---|---|
| Fresh paint | 1410 | 1427 |
| 1 week | 1319 | 854 |
| 1 month | 1400 | 867 |
| 2 month | 1178 | 800 |
| 3 month | 1488 | 615 |
| 5 month | 1353 | 302 |
| 6 month | 1543 | 491 |

As shown in Table 2, the scrubability of the paint prepared in Example 10 remained unchanged for paint aged up to 6 months. The scrubability of the comparative example, Example 9, started to drop after being aged for one week, and continued to decrease afterwards.

Example 12

Preparation of Paints Using Various hydrazones

The polymer used in paints of Example 12 was an acrylic latex polymer containing MMA 48.1%, 2-EHA 47.9%, DAAM 4% by weight. The latex polymer had solids of 49% w/w. The batch size was 50 gallons. The formulas for each of the paints are listed in Table 3.

Summary of example paints:

Example 12A, the blocked cross-linking agent was adipic acid di(2-propylidene hydrazide) dry powder prepared in Example 3 in powdered form.

In Example 12B, the blocked cross-linking agent was adipic acid di(2-butylidene hydrazide) in an aqueous dispersion prepared in Example 7. The total amount of water was reduced to adjust the volume to 50 gallons.

In Example 12C, the blocked cross-linking agent was adipic acid di(2-propylidene hydrazide) in an aqueous dispersion prepared in Example 6.

In Example 12D, the blocked cross-linking agent was of adipic acid di(4-hydroxy-4-methyl-2-pentylidene hydrazide) in an aqueous dispersion prepared in accordance with Example 8. The total amount of water was reduced to adjust the volume to 50 gallons.

In Example 12E, the multi-functional hydrazones were prepared during paint formulation. The reactants adipic acid dihydrazide and 2-propanone were added during formulation of the paint product. The reaction product, adipic acid di(2-propylidene hydrazide), was formed in the paint making process.

Example 12F is a comparative example using a conventional cross-linking agent adipic acid dihydrazide.

TABLE 3

Paints of Example 12

| Ingredient | A | B | C | D | E | F |
|---|---|---|---|---|---|---|
| WATER | 29.7 lbs | 29.7 lbs | 29.7 lbs | 29.7 lbs | 29.7 lbs | 29.7 lbs |
| KATHON LX 1.5% (biocide) | 0.6 | 0.6 | 0.6 | 0.6 | 0.6 | 0.6 |
| TAMOL 165A (dispersant) | 6.0 | 6.0 | 6.0 | 6.0 | 6.0 | 6.0 |
| FOAMSTAR A-45 (defoamer) | 0.6 | 0.6 | 0.6 | 0.6 | 0.6 | 0.6 |
| TRONOX CR-826 (TiO2) | 134.2 | 134.2 | 134.2 | 134.2 | 134.2 | 134.2 |
| ASP 170 (extender pigment) | 13.5 | 13.5 | 13.5 | 13.5 | 13.5 | 13.5 |
| POTASSIUM CARBONATE | 0.8 | 0.8 | 0.8 | 0.8 | 0.8 | 0.8 |
| Grind for 20 min, then add | 220.1 | 220.1 | 220.1 | 220.1 | 220.1 | 220.1 |
| Acrylic Polymer (MMA/EHA/DAAM) | | | | | | |
| OPTIFILM ENHANCER 400 (plasticizer) | 5.0 | 5.0 | 5.0 | 5.0 | 5.0 | 5.0 |
| Example 3 | 1.9 | — | — | — | — | — |
| Example 7 | — | 32.5 | — | — | — | — |
| Example 6 | — | — | 4.8 | — | — | — |
| Example 8 | — | — | — | 31.9 | — | — |
| 2-PROPANONE | — | — | — | — | 1.2 | — |
| ADIPIC ACID DIHYDRAZIDE | — | — | — | — | 1.5 | 1.5 |
| BYK-022 (defoamer) | 3.0 | 3.0 | 3.0 | 3.0 | 3.0 | 3.0 |

TABLE 3-continued

| | Paints of Example 12 | | | | | |
|---|---|---|---|---|---|---|
| Ingredient | A | B | C | D | E | F |
| WATER | 33.4 | 33.4 | 33.4 | 33.4 | 33.4 | 33.4 |
| ACRYSOL RM-2020 NPR (rheology additive) | 7.5 | 7.5 | 7.5 | 7.5 | 7.5 | 7.5 |
| ACRYSOL RM-8W (rheology additive) | 12.5 | 12.5 | 12.5 | 12.5 | 12.5 | 12.5 |
| POLYPHASE 678 (mildewcide) | 1.0 | 1.0 | 1.0 | 1.0 | 1.0 | 1.0 |
| WATER | 66.9 | 36.1 | 64.9 | 36.1 | 66.1 | 67.6 |

The scrubability was tested for aged paints in Example 12. The test method and conditions were the same as in Example 11. As can be seen in Table 4, the paint films produced by the water-borne paints of Example 12A, B, C, and E, using various hydrazones, have significantly higher scrubs than the paint film produced pursuant to film of Example 12F which involved a conventional cross-linking agent, adipic acid dihydrazide.

Example 12D had relatively lower scrub cycles. Adipic acid di(4-hydroxy-4-methyl-2-pentylidene hydrazide) yielded a by-product of 4-hydroxy-4-methyl-2-pentanone in water. 4-Hydroxy-4-methyl-2-pentanone has a relatively high boiling point at 166° C., and lower evaporation rate of 0.12 (vs. n-butyl acetate). In preferred embodiments, the by-product ketone should evaporate in order to shift the equilibrium in Equation III to the right side. The low volatility of 4-hydroxy-4-methyl-2-pentanone may have reduced the rate of cross-linking in the film.

TABLE 4

Scrubability of Aged Paints in Example 12

| | | Scrub cycle | |
|---|---|---|---|
| Example | Cross-linking agent | Aged for 2 months | Aged for 4 months |
| A | adipic acid di(2-propylidene hydrazide) dry powder | 1150 | Not tested |
| B | adipic acid di(2-butylidene hydrazide) dispersion | 1300 | 1219 |
| C | adipic acid di(2-propylidene hydrazide) dispersion | 1322 | 1061 |
| D | adipic acid di(4-Hydroxy-4-methyl-2-pentylidene hydrazide) dispersion | 393 | Not tested |
| E | adipic acid di(2-propylidene hydrazide) Prepared in Paint | 1074 | Not tested |
| F | Adipic acid dihydrazide (comparative) | 804 | 539 |

Example 13

Latex polymer with ketone Groups on the polymer Chains and dihydrazone in Aqueous Phase.

A styrene acrylic polymer containing DAAM was prepared according to the recipe in Table 5 by emulsion polymerization.

The emulsion polymerization was carried out in a four-neck flask under nitrogen purge. The reaction flask was equipped with a condenser, a thermometer, an agitator and a feeding pump. The flask was immersed in a temperature controlled water bath maintained at a constant temperature within about ±0.1° C. of the set point.

The reaction started with charging deionized water, ADEKA SR-10, and sodium bicarbonate to the reaction flask. The reactor was heated to 75° C. under agitation. 5% w/w of the monomer mix was charged to the reactor. After mixing for 5 minutes, the Initiator Solution 1 shown in Table 5 was added to the reaction flask to start the polymerization.

Fifteen minutes after the start of the reaction, the remaining monomer mix and Initiator Solution 2 shown in Table 5 were fed to the reaction flask over a period of 3.5 hours. The temperature of the reaction flask was then maintained at 80-85° C. for one hour after which it was cooled to about 65° C. Chaser solutions made from oxidizing agent and reducing agent were fed to the reaction flask over 30 minutes. The reaction contents were then cooled to 35° C. and sodium hydroxide/water solution was added.

Adipic acid di(2-propylidene hydrazide) solution was then added as the blocked cross-linking agent.

TABLE 5

| Component | Parts (by weight) |
|---|---|
| Initial Charge in Reactor | |
| Deionized water | 32.8 |
| ADEKA SR-10 (surfactant) | 0.02 |
| Sodium bicarbonate | 0.02 |
| Monomer Mix | |
| Deionized water | 10.5 |
| Diacetone acrylamide | 1.7 |
| ADEKA SR-10 | 0.6 |
| Ethylmethacrylate phosphate 30% (Sipomer PAM-4000) | 0.2 |
| ADEKA ER-30 (surfactant) | 0.6 |
| Methacrylic acid | 0.2 |
| Methylmethacrylate | 12.4 |
| Butyl acrylate | 21.4 |
| Styrene | 10.2 |
| Wet adhesion monomer 50%, (Rohm & Haas (now Dow Chemical Company), QM-1458) | 1.1 |
| Initiator Solution 1 | |
| Ammonium persulfate | 0.1 |
| Deionized water | 0.4 |
| Initiator Solution 2 | |
| Ammonium persulfate | 0.1 |
| Deionized water | 0.8 |
| Chaser solutions | |
| 1) Oxidizing agent | |
| t-butylperoxide | 0.06 |
| Deionized water | 0.4 |
| 2) Reducing agent | |
| Bruggolite ® FF6M | 0.04 |
| Deionized water | 0.6 |

TABLE 5-continued

| Component | Parts (by weight) |
|---|---|
| Pre-mix | |
| Sodium hydroxide solution 50% | 0.2 |
| Deionized water | 2.0 |
| Adipic acid di(2-propylidene hydrazide) | 2.4 |
| Total | 100 |

The final product is a cross-linkable latex paint.

Example 14

Low MW Latex polymer with ketone Group Using diacetone acrylamide

An acrylic polymer containing DAAM was prepared according to the recipe in Table 6 by emulsion polymerization. The emulsion polymerization was carried out in a four-neck flask under nitrogen purge. The reaction flask was equipped with a condenser, a thermometer, an agitator and a feeding pump. The flask was immersed in a temperature controlled water bath maintained at a constant temperature within about ±0.1° C. of the set point.

The reaction started with charging deionized water, Rhodacal® DS4 to the reaction flask. The contents of the reactor were heated to 75° C. under agitation. 5% w/w of the monomer mix was charged. After mixing for 5 minutes, the Initiator Solution 1 shown in Table 6 was added to the reaction flask to start the seed polymerization.

15 minutes after the start of the reaction, the remaining monomer mix, and Initiator Solution 2 shown in Table 6, were fed to the reaction flask over a period of 3.5 hours. A small amount of water was used to rinse the monomer mix flask. The temperature of the reaction flask was then maintained at 80-85° C. for one hour after which it was cooled to about 65° C. Chaser solutions made from oxidizing agent and reducing agent were fed to the reaction flask over 30 minutes. The reaction contents were then cooled to 35° C. and ammonia solution was added.

The polymer has the number average molecular weight 24,700 g/mol, a weight average molecular weight 60,400 g/mol, and a Tg of 1.7° C. as determined on a Differential Scanning Calorimeter.

TABLE 6

Emulsion polymerization of an acrylate polymer with Diacetone acrylamide

| Component | Parts (by weight) |
|---|---|
| Initial Charge in Reactor | |
| Deionized water | 760 |
| Rhodacal ® DS4 (23% w/w) | 1.2 |
| Monomer Mix | |
| Deionized water | 200 |
| Diacetone acrylamide | 30 |
| Rhodacal ® DS4 (23% w/w) | 40 |
| Rhodafac RS-610-25A (phosphate surfactant) | 20 |
| Rhodasurf BC-729 (surfactant from Rhodia) | 3 |
| Methacrylic acid | 12 |
| Methyl methacrylate | 500 |
| 2-Ethyl hexylacrylate | 570 |

TABLE 6-continued

Emulsion polymerization of an acrylate polymer with Diacetone acrylamide

| Component | Parts (by weight) |
|---|---|
| Wet adhesion monomer 50% w/w, (Visiomer MEEU 50W, Evonik) | 25 |
| Isooctyl 3-mercapto propionate | 8 |
| Initiator Solution 1 | |
| Ammonium persulfate | 2.5 |
| Deionized water | 30 |
| Initiator Solution 2 | |
| Ammonium persulfate | 2.5 |
| Deionized water | 30 |
| Chaser solutions | |
| 1) Oxidizing agent | |
|   t-butylperoxide | 1.4 |
|   Deionized water | 10 |
| 2) Reducing agent | |
|   Bruggolite ® FF6M | 1.0 |
|   Deionized water | 15 |
| Ammonia hydroxide solution 29% | 10 |
| Deionized water (rinse) | 10 |

Example 15

Low MW Latex polymer with ketone Group Using acetoacetoxyethyl methacrylate

In Example 15, acetoacetoxyethyl methacrylate was used in an acrylic polymer formula as shown in Table 7.

The process of making the latex polymer is the same as in Example 14.

TABLE 7

Emulsion polymerization of acrylic latex polymer with acetoacetoxyethyl methacrylate

| Component | Parts (by weight) |
|---|---|
| Initial Charge in Reactor | |
| Deionized water | 900 |
| TRITON ™ QS-44 (surfactant from Dow Chemical) | 1 |
| Sodium Bicarbonate | 4 |
| Monomer Mix | |
| Deionized water | 330 |
| TRITON ™ QS-44 | 14 |
| Igepal CO-630 (surfactant from Rhodia Inc.) | 8.5 |
| Ammonia hydroxide 29% | 30 |
| Acetoacetoxyethyl methacrylate | 111 |
| Methacrylic acid | 14 |
| Methyl methacrylate | 500 |
| Butyl Acrylate | 660 |
| Wet adhesion monomer 50% w/w, (WAM (IV) from Air Product) | 26 |
| Isooctyl 3-mercapto propionate | 11 |
| Initiator Solution 1 | |
| Sodium persulfate | 3.5 |
| Deionized water | 30 |
| Initiator Solution 2 | |
| Sodium persulfate | 3.5 |
| Deionized water | 30 |
| Chaser solutions | |
| 1) Oxidizing agent | |
|   t-butylperoxide | 6.5 |
|   Deionized water | 30 |

TABLE 7-continued

Emulsion polymerization of acrylic latex polymer with acetoacetoxyethyl methacrylate

| Component | Parts (by weight) |
|---|---|
| 2) Reducing agent | |
| Sodium formaldehyde sulfoxylate | 4.5 |
| Deionized water | 20 |

Example 16

Low MW Latex polymer with ketone Group and epoxy Group Using acetoacetoxyethyl methacrylate and glycidyl methacrylate In Example 16, acetoacetoxyethyl methacrylate and glycidyl methacrylate were used in an acrylic polymer formula as shown in Table 8.

The process of making the latex polymer was the same as in Example 14.

TABLE 8

Emulsion polymerization of acrylic latex polymer with acetoacetoxyethyl methacrylate and glycidyl methacrylate

| Component | Parts (by weight) |
|---|---|
| Initial Charge in Reactor | |
| Deionized water | 900 |
| TRITON ™ QS-44 (surfactant from Dow Chemical) | 1 |
| Sodium Bicarbonate | 4 |
| Monomer Mix | |
| Deionized water | 330 |
| TRITON ™ QS-44 | 15.3 |
| Igepal CO-630 (surfactant from Rhodia Inc.) | 8.5 |
| Ammonia hydroxide 29% | 30 |
| Acetoacetoxyethyl methacrylate | 40 |
| Glycidylmethacrylate | 13.5 |
| Methacrylic acid | 20 |
| Methyl methacrylate | 500 |
| Butyl Acrylate | 660 |
| Wet adhesion monomer 50% w/w, (WAM (IV) from Air Product) | 26 |
| Isooctyl 3-mercapto propionate | 12 |
| Initiator Solution 1 | |
| Sodium persulfate | 3.5 |
| Deionized water | 30 |
| Initiator Solution 2 | |
| Sodium persulfate | 3.5 |
| Deionized water | 30 |
| Chaser solutions | |
| 1) Oxidizing agent | |
| t-butylperoxide | 6.5 |
| Deionized water | 30 |
| 2) Reducing agent | |
| Sodium formaldehyde sulfoxylate | 4.5 |
| Deionized water | 20 |

Example 17

Paint Composition Containing hydrazone Blocked Cross-linker and polymer with ketone Group.

Example 17 describes a paint composition containing an acrylic polymer of Example 14 and a blocked cross-linker of Example 3. The paint composition formulation, in order of the various components' addition is described in Table 9.

Example 18

Paint Composition Containing hydrazine Blocked Cross-linker and polymer with ketone Group. (Comparative Example)

Example 18 is a comparative paint composition containing an acrylic polymer of the Example 14 and a conventional cross-linker having a hydrazine group (—NHNH2), adipic acid dihydrazide. The paint composition formulation, in order of the various components' addition, is described in Table 9.

Example 19

Paint Composition Containing a Commercial polymer for Primers (Comparative Example).

Example 19 is a comparative paint composition containing a commercial polymer designed to be a primer, tested for chalk adhesion. The paint composition formulation, in order of the various components' addition, is described in Table 9.

TABLE 9

| Description | Example 17 | Example 18 | Example 19 |
|---|---|---|---|
| WATER | 234 lbs | 234 lbs | 234 lbs |
| NATROSOL PLUS 330 (thickener) | 3.5 | 3.5 | 3.5 |
| SODIUM BENZOATE | 2.0 | 2.0 | 2.0 |
| NUOSEPT 95 | 1.0 | 1.0 | 1.0 |
| MIX 5-10 MINUTES ON HIGH SPEED | 0.0 | 0.0 | 0.0 |
| TAMOL 681 | 6.0 | 6.0 | 6.0 |
| ZN OXIDE SOGEM EPM-E | 9.0 | 9.0 | 9.0 |
| TRONOX CR-826 | 122.0 | 122.0 | 122.0 |
| OPTIWHITE P | 90.0 | 90.0 | 90.0 |
| FOAMASTER V (Cognis) | 1.0 | 1.0 | 1.0 |
| Grind for 20 minute | | | |
| Thin - Down | | | |
| TRITON CF-10 | 1.1 | 1.1 | 1.1 |
| Commercial Tanning Blocking Polymer 43% w/w | — | — | 408 |
| Polymer of Example 14, 49% w/w | 345 | 345 | |
| ROPAQUE OP-96 | 49.0 | 49.0 | 49.0 |
| TEXANOL Eastman Chemical | 7.9 | 7.9 | 7.9 |
| WATER | 64.4 | 117.4 | 64.4 |
| ADIPIC ACID DIHYDRAZIDE | | 3.0 | |
| Cross-linker of Example 3 | 12 | | |
| NATROSOL PLUS 330 | 1 | 0 | 2.0 |
| WATER | 50 | 6.8 | 6.8 |
| DREWPLUS L 475 FOAM | 3.3 | 3.3 | 3.3 |
| Total weight lbs | 1002 | 1002 | 1011 |
| Total Volume gallon | 100 | 100 | 100 |

Example 20

Adhesion Test

Chalk binding tests are typically performed on chalky substrates. Chalky substrates are commercial alkyd paints that have been naturally weathered to achieve an ASTM chalk rating of about from 1-10, with 1 being the worst chalk board. A suitable test method is described in U.S. Pat. No. 6,268,420, the test method is hereby incorporated by reference.

In these cases, chalky substrates are western red cedar panels painted with commercially available alkyd paints and weathered to have ASTM ratings using the method described in the '420 patent. Various 3-mil thick draw down coatings of paint compositions were applied to these panels and let dry for about 7 days at ambient conditions. After drying, adhesion of the paint was evaluated using Scotch ™ 600 tape and a 6×6 cross-hatch adhesion standard test, as detailed in ASTM D3359 Method B. For wet chalk adhesion, the coated panels were placed in a fog box, simulating rain conditions at 100% humidity, for about 4 hours and were dried in air at ambient conditions for about 1 hour prior to the cross-hatch adhesion test. The percentage peeling (area) for coatings made from each of the paint compositions of Examples 16, 17 and 18 are listed in Table 10 (0% is best, 100% is very poor).

TABLE 10

| Chalk adhesion | | | |
|---|---|---|---|
| | Example 16 | Example 17 | Example 18 |
| Dry Chalk Adhesion (#2 chalk board) | | | |
| Fresh paint | 0% | 0% | 100% |
| 1 month aged paint | 0% | 0% | — |
| Wet Chalk Adhesion (#2.8 chalk board) | | | |
| Fresh paint | 0% | 0% | 50% |
| 1 month aged paint | 0% | 40% | 80% |

Example 21

Preparation of adipic acid di(2-propylidene hydrazide) Dispersion with a rheology Additive In a stainless steel flask equipped with an agitator, 54.6 grams of water were added, the agitator was turned on, then 25 grams of adipic acid dihydrazide were added. The mixture was agitated for at least 10 minutes until a stable dispersion was formed. 16.4 grams of 2-propanone were then added under mixing. A clear solution formed after a few minutes. Mixing was continued for at least another hour until reaction product precipitated and formed a stable dispersion. 4 grams of AQUAFLOW NLS-200 (rheology additive) were added to the dispersion under agitation.

The slurry dispersion has improved anti-settling property behavior.

Example 22

Preparation of adipic acid di(2-propylidene hydrazide) Dispersion with a Latex and a rheology Additive In a stainless steel flask equipped with an agitator, 45.6 grams of water were added, the agitator was turned on, then 25 grams of adipic acid dihydrazide were added. The mixture was agitated for at least 10 minutes until a stable dispersion was formed. 16.4 grams of 2-propanone were then added under mixing. A clear solution formed after a few minutes. Mixing was continued for at least another hour until reaction product precipitated and formed a stable dispersion. The temperature of the dispersion was allowed to drop to 105° F. or below, and 10 grams of an acrylic latex containing 51% of methacrylate and butyl acrylic polymer were added, followed by 3.0 grams of AQUAFLOW NLS-200. The Stormer viscosity of the dispersion was 105 Kreb units at 77° F.

The slurry dispersion has improved anti-settling property behavior.

Therefore, while embodiments of the invention are described with reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

What is claimed is:

1. A water-borne polymeric composition suitable for application to surface, which consists essentially of:
    water;
    one or more polymers for coalescence or drying into polymer solids, each polymer comprising one or more carbon groups, one or more epoxy groups, or both one or more carbonyl groups and one or more epoxy groups; and
    a cross-linking agent which reacts with said carbonyl or epoxy groups or with both said carbonyl and epoxy groups, a blocked cross-linking agent having at least one hydrazone group incorporated therein, and a ketone or aldehyde, the blocked cross-linking agent being the reaction product of the ketone or aldehyde with the cross-linking agent;
    in which composition, before its application to the surface, a reversible reaction of said blocked cross-linking agent produces said ketone or aldehyde and said cross-linking agent, with the reaction being at equilibrium such that the amount of the cross-linking agent is greater than 0% and less than or equal to 3% in said water-borne composition;
    said reversible reaction being such that after said composition's application to the surface a reduction of the amount of ketone or aldehyde causes a shift toward the production of the cross-linking agent, and a resultant completion of its reaction with said carbonyl or epoxy groups or with both said carbonyl and epoxy groups, to yield a cross-linked water-resistant scrubable polymeric material.

2. The water-borne polymeric composition of claim 1, which comprises different chain polymers for coalescence or drying into polymer solids, each polymer comprising one or more reactive carbonyl groups, one or more reactive epoxy groups, or both one or more reactive carbonyl groups and one or more reactive epoxy groups.

3. The water-borne polymeric composition of claim 2, wherein the polymers are present in the composition in a range of 3% to 60% by weight.

4. The water-borne polymeric composition of claim 3, wherein a ratio of the moles of blocked cross-linking agent to the number of said reactive groups is from 0.1:1 to 2:1.

5. The water-borne polymeric composition of claim 1, wherein the blocked cross-linking agent comprises at least two hydrazone groups.

6. The water-borne polymeric composition of claim 1, wherein the blocked cross-linking agent further comprises a hydrazine group.

7. The water-borne polymeric composition of claim 1, wherein the pH of the composition is from 6.5 to 10.3.

8. The water-borne polymeric composition of claim 7, wherein the pH of the composition is from 8.0 to 9.8.

9. The water-borne polymeric composition of claim 8, wherein the pH of the composition is from 8.5 to 9.5.

10. The water-borne polymeric composition of claim 1, wherein the blocked cross-linking agent is of formula:

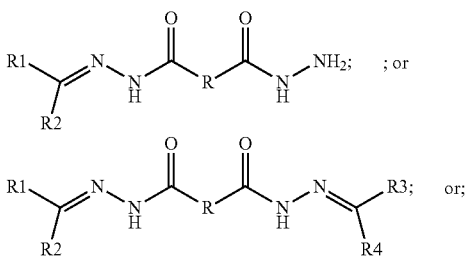

is at least one blocked cross-linking agent of each of said formulae;
wherein R is a divalent organic group or a covalent bond, and each of R1, R2, R3, and R4 is selected to be independently of the others hydrogen or an organic group.

11. The water-borne polymeric composition of claim 10, wherein each of R1, R2, R3, and R4 is selected, to be, independently of the others: C1 to C12 linear alkyl, alkenyl, or alkynyl; or a branched alkyl, alkenyl, or alkynyl having a C1 to C12 primary chain; or R1 and R2 or R3 and R4 are joined together to form a cyclic organic group or said linear or branched alkyl, alkenyl, or alkynyl being substituted with an hydroxyl, amino, phenyl, benzyl, or halogen.

12. The water-borne polymeric composition of claim 11, wherein each of R1, R2, R3, and R4 is selected to be independently of the others methyl, ethyl, n-propyl, n-butyl, iso-butyl, tert-butyl, n-amyl, iso-amyl, n-hexyl, n-heptyl, n-octyl, iso-octyl, n-nonyl, n-decyl, n-undecyl or n-dodecyl.

13. The water-borne polymeric composition of claim 11, wherein the cyclic group is cyclopentyl or cyclohexy.

14. The water-borne polymeric composition of claim 1, wherein the carbonyl is incorporated within a ketone, aldehyde, or anhydride group.

15. The water-borne polymeric composition of claim 1, wherein the polymeric composition functions as a paint, primer, coating, ink, or adhesive.

16. The water-borne polymetric composition of claim 1, wherein the blocked cross-linking agent has the following formula:

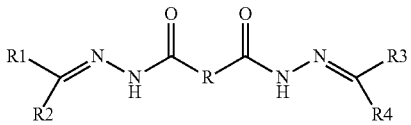

wherein R is a divalent organic group or a covalent bond and each of R1, R2, R3, and R4 is selected to be independently of the others hydrogen or an organic group.

17. The water-borne polymeric composition of claim 16, wherein R, in combination with the carbonyl groups adjacent to it, forms an oxalic, malonic, succinic, glutaric, adipic or sebacic moiety.

18. The water-borne polymeric composition of claim 1, wherein the blocked cross-linking agent has the following formula:

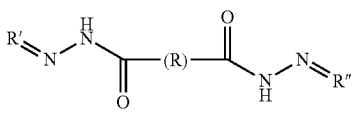

wherein each of R' and R" is selected to be independently of the other a cyclic organic group and wherein R is a divalent organic group or a covalent bond.

19. The water-borne polymeric composition of claim 1, wherein the blocked cross-linking agent is adipic acid di(2-butylidene hydrazide).

20. A method of preparing a water-borne composition suitable for application to a surface, which consists essentially of:
providing an aqueous dispersion including water, one or more cross-linkable polymers for coalescence or drying into polymer solids, a cross-linking agent, a blocked cross-linking agent comprising at least one hydrazone group, and ketone or aldehyde, the blocked cross-linking agent being the reaction product of the ketone or aldehyde with the cross-linking agent;
subjecting said dispersion to conditions inducing said cross-linking agent, blocked cross-linking agent and ketone or aldehyde to come to equilibrium with one another before said composition's application to the surface such that the amount of the cross-linking agent is greater than 0% and less than or equal to 3% in the water-borne composition;
wherein at least one polymer in the dispersion comprises one or more carbonyl groups, one or more epoxy groups, or both one or more carbonyl groups and one or more epoxy groups, and wherein said cross-linking agent reacts with said carbonyl or epoxy groups or with both said carbonyl and epoxy groups.

21. A method of coating a surface, which consists essentially of:
applying a water-borne polymeric composition to a surface, the composition comprising an aqueous polymeric dispersion including water, one or more polymers for coalescence or drying into polymer solids when applied to a surface, a cross-linking agent, a blocked cross-linking agent comprising at least one hydrazone group, and ketone or aldehyde, the blocked cross-linking agent being the reaction product of the ketone or aldehyde with the cross-linking agent;
in which composition, prior to being applied to the surface, an equilibrium is established such that the amount of the cross-linking agent is greater than 0% and less than or equal to 3% in said water-borne composition;
wherein at least one of the polymers comprises one or more carbonyl groups, one or more epoxy groups both one or more carbonyl groups and one or more epoxy groups, and said cross-linking agent is reactive with said carbonyl or epoxy groups or with both said carbonyl and epoxy groups; and
after said composition's application to the surface subjecting said composition to conditions inducing a reduction of the amount of ketone or aldehyde which causes a shift toward production of the cross-linking agent and a resultant completion of its reaction with said carbonyl or epoxy groups or with both said carbonyl and epoxy groups, to yield a cross-linked water-resistant scrubable polymeric material.

22. A coating on a surface which is formed in accordance with the method defined in claim 21.

23. A water-borne composition suitable for application to a surface, which consists essentially of:
water;
at least one polymer for coalescence or drying into polymer solids, each said polymer having functionality capable of reacting with a cross-linking agent wherein said functionality is one or more carbonyl groups, one or more epoxy groups, or both one or more carbonyl groups and one or more epoxy groups; and a cross-linking agent capable of reacting with said functionality, and a blocked cross-linking agent having at least one hydrazone group that is not capable of reacting with any carbonyl or epoxy groups of the polymer but is convertible to an alternate functional group to provide the cross-linking agent which is capable of reacting with said carbonyl or epoxy groups or with both said carbonyl and epoxy groups;

the composition further comprising ketone or aldehyde, the blocked cross-linking agent being the reaction product of the ketone or aldehyde with the cross-linking agent;

in which composition, before its application to the surface, a reversible reaction of said blocked cross-linking agent produces said ketone or aldehyde and said cross-linking agent, with the reaction being at equilibrium such that the amount of the cross-linking agent is greater than 0% and less than or equal to 3% in the water-borne composition;

said reversible reaction being such that after said composition's application to the surface a reduction of the amount of ketone or aldehyde causes a shift toward the production of the cross-linking agent and a resultant completion of its reaction with said carbonyl or epoxy groups or with both said carbonyl and epoxy groups, to yield a cross-linked water-resistant scrubable polymeric material.

24. The water-borne composition of claim 23, wherein said shift toward production of the cross-linking agent is caused by evaporation of said ketone or aldehyde.

25. A water-borne primer latex, which consists essentially of:
water;
a plurality of polymers for coalescence or drying into polymeric solids, each said polymer having a number average molecular weight less than 100,000 Daltons, and a glass transition temperature less than 10° C., and each said polymer comprising one or more carbonyl groups, one or more epoxy groups, or both one or more carbonyl groups and one or more epoxy groups: and
a cross-linking agent which reacts with said carbonyl or epoxy groups or with both said carbonyl and epoxy groups, a blocked cross-linking agent having at least one hydrazone group incorporated therein, and ketone or aldehyde, the blocked cross-linking agent being the reaction product of the ketone or aldehyde with the cross-linking agent;
in which latex, before application to the surface, a reversible reaction of said blocked cross-linking agent produces said ketone or aldehyde and said cross-linking agent, with the reaction being at equilibrium such that the amount of the cross-linking agent is greater than 0% and less than or equal to 3% in the water-borne composition;
said reversible reaction being such that after said latex's application to the surface a reduction of the amount of ketone or aldehyde causes a shift toward the production of the cross-linking agent and a resultant completion of its reaction with said carbonyl or epoxy groups or with both said carbonyl and epoxy groups, to yield a cross-linked water-resistant scrubable polymeric material.

26. The water-borne primer latex of claim 25, wherein the glass transition temperature is less than 6° C.

27. The water-borne primer latex of claim 25, wherein the glass transition temperature is less than 4° C.

28. The water-borne primer latex of claim 25, wherein said polymers comprise a number average molecular weight less than 50,000 Daltons.

29. The water-borne primer latex of claim 25, wherein said polymers comprise a number average molecular weight less than 25,000 Daltons.

30. The water-borne primer latex of claim 25, wherein the polymers are present in the composition in a range of 3% to 60% by weight.

31. The water-borne primer latex of claim 25, wherein a ratio of the moles of blocked cross-linking agent and the number of reactive carbonyl and epoxy groups on the polymer chains is from 0.1:1 to 2:1.

32. The water-borne primer latex of claim 25, wherein the blocked cross-linking agent comprises at least two hydrazone groups.

33. The water-borne primer latex of claim 25, wherein the blocked cross-linking agent further comprises a hydrazine group.

34. The water-borne primer latex of claim 33, wherein the blocked cross-linking agent has the following formula:

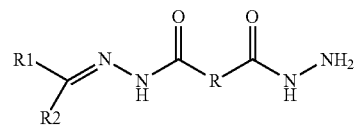

wherein R is a divalent organic, group or a covalent bond and each of R1, R2, R3, and R4 is selected to be independently of the others hydrogen or an organic group.

35. The water-borne primer latex of claim 34, wherein R, in combination with the carbonyl groups adjacent to it, forms an oxalic, malonic, succinic, glutaric, adipic or sebacic moiety.

36. The water-borne primer latex of claim 25, wherein the pH of the composition is from 6.5 to 10.3.

37. The water-borne primer latex of claim 25, wherein the blocked cross-linking agent is of the formula:

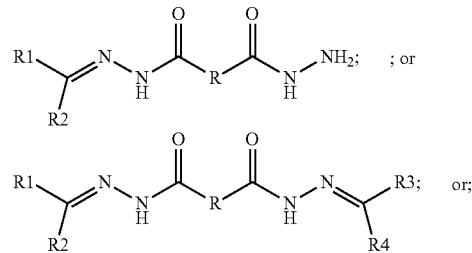

wherein there is at least one blocked cross-linking agent of each said formula; and
wherein R is a divalent organic group or a covalent bond, and each of R1, R2, R3, and R4 is selected to be independently of the others hydrogen or an organic group.

38. The water-borne primer latex of claim 37, wherein each of R1, R2, R3, and R4 is selected to be independently of the others: C1 to C12 linear alkyl, alkenyl, or alkynyl group; a branched alkyl, alkenyl, or alkynyl group having a C1 to C12 primary chain; or R1 and R2 or R3 and R4 joined together to form a cyclic organic group or said linear or branched alkyl, alkenyl, or alkynyl group substituted with an hydroxyl, amino, phenyl, benzyl, or halogen.

39. The water-borne primer latex of claim 38, wherein each of R1, R2, R3, and R4 is selected to be independently of the others methyl, ethyl, n-propyl, n-butyl, iso-butyl, tert butyl, n-amyl, iso-amyl, n-hexyl, n-heptyl n-octyl, iso-octyl, n-nonyl, n-decyl, n-undecyl or n-dodecyl.

40. The water-borne primer latex of claim 38, wherein the cyclic group is cyclopentyl or cyclohexyl.

41. The water-borne primer latex of claim 25, wherein the carbonyl is incorporated within ketone, aldehyde, or anhydride group.

42. The water-borne primer latex of claim 25, wherein the blocked cross-linking agent has the following formula:

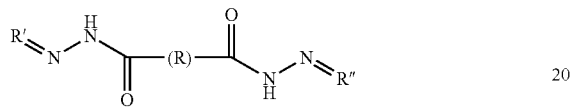

wherein each of R' and R" is selected to be independently of the other a cyclic organic group and wherein R is a divalent organic group or a covalent bond.

43. The water-borne primer latex of claim 25, wherein the blocked cross-linking agent is adipic acid di(2-butylidene hydrazide.

* * * * *